Nov. 3, 1931.    V. G. APPLE    1,830,457

DYNAMO ELECTRIC MACHINE WITH IMPROVED COOLING SYSTEM

Filed April 7, 1930

INVENTOR
Vincent G. Apple

Patented Nov. 3, 1931

1,830,457

UNITED STATES PATENT OFFICE

VINCENT G. APPLE, OF DAYTON, OHIO

DYNAMO ELECTRIC MACHINE WITH IMPROVED COOLING SYSTEM

Application filed April 7, 1930. Serial No. 442,393.

This invention relates to dynamo electric machines and particularly to those which are subjected in operation to unusually high temperature.

The object of the invention is to provide a dynamo electric machine wherein the housing may be completely closed, but which has novel cooling means capable of carrying off an unusual amount of heat, thus adapting it to situations where the surrounding air is either too hot or contains dust or other foreign matter detrimental to the interior of the motor, or to situations where a high percentage of overload must be carried.

I attain this object in the structure hereinafter described, an illustrative embodiment being shown in the drawings wherein—

Similar numerals refer to similar parts throughout the several views.

Figure 1:
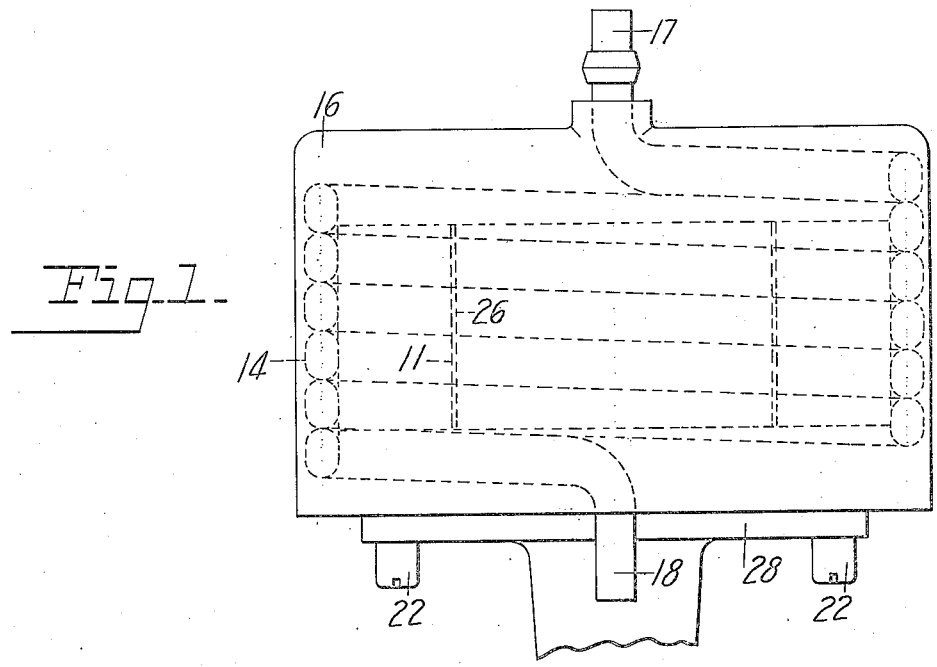
Fig. 1 is an elevation of a motor constructed according to my invention.
Figure 2:
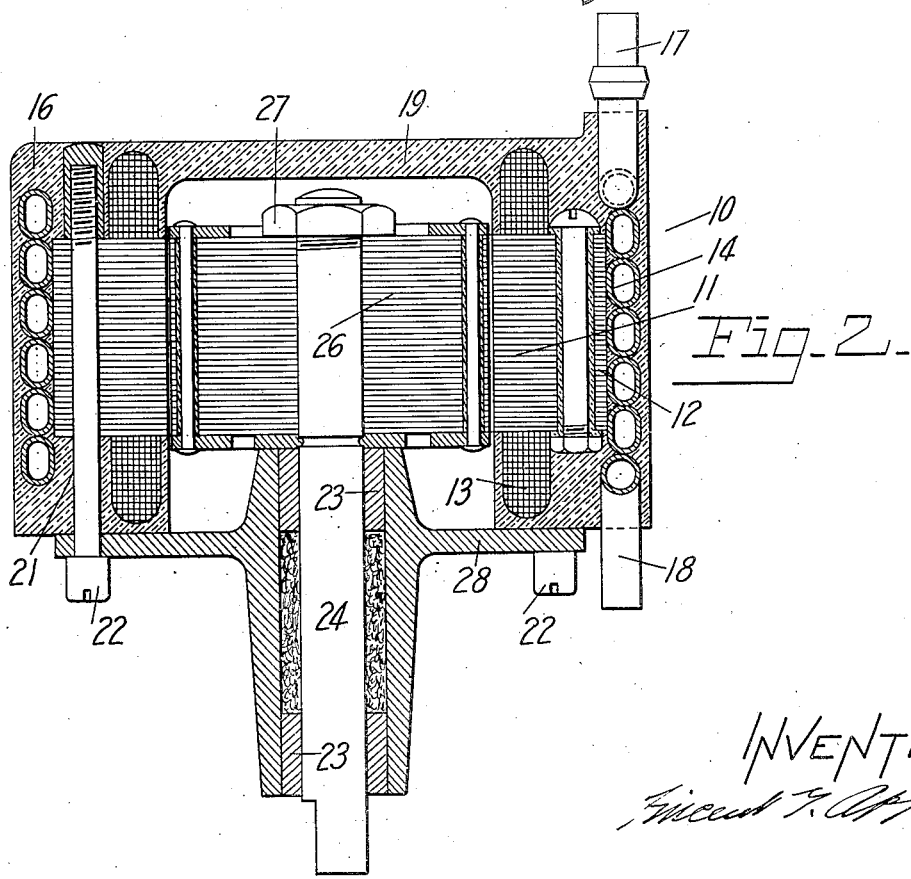
Fig. 2 is an axial section through the motor.

The stator element 10 comprises a magnetizable core 11 composed of laminæ 12, windings 13, a cooling coil 14 of metal tubing wound about and in contact with the stator core, and a housing 16 of plastic compound molded about the core around the several turns of the cooling core and surrounding and penetrating the interstices of the winding.

The compound composing the housing is preferably of a kind having a high degree of heat conductivity but a low degree of electrical conductivity so that the portion separating the several turns of the winding will electrically insulate one turn from another and the portions separating the winding from the cooling coil will rapidly convey the heat from the winding to the cooling coil.

In constructing the stator element the core 11 is first made by assembling and securing together a sufficient number of the laminæ 12, then the winding 13 is put on the core. A length of metal tubing is then wound around a suitable mandrel to compose the cooling coil 14, the ends of which are left extending as at 17 and 18. The cooling coil may first be filled with natural resin or other suitable filler which may afterwards be readily melted and removed, then placed around the wound core preferably tightly against it, whereupon the structure is placed in a mold adapted to support the several parts in proper spaced relation, and the plastic compound is compressed through and about the core, winding and cooling coil to fill all voids within the winding and between the core and coil, completely covering the structure and forming the housing 16 closed at the one end as at 19.

The plastic compound is hardened while under pressure in the mold after which the structure is removed therefrom. The filler in the cooling coil, which prevented it being crushed while molding was being effected, is then removed and the stator element is complete.

A bearing head 20 is secured to the open end of the stator element by bolts 21 and nuts 22. Head 20 carries two widely spaced apart bearings 23 within which shaft 24 is rotatably supported. The rotor 26 is secured in overhung fashion to shaft 24 by nut 27.

In operation the ends 17 and 18 of cooling coil 14 are connected to a source of supply of a suitable cooling fluid, as for instance to a city water supply line, and during operation of the motor the coolant is constantly permitted to circulate through the coil. By a suitable valve in the line the degree to which the motor is cooled may be regulated.

Because of the fact that molding material having high heat conducting properties has been selected for housing 16, the heat is readily transferred from the winding 13 and from the core 11 to the cooling coil 14, since this material penetrates the winding, surrounding the individual turns thereof, and also extends completely around the core and the turns of the cooling coil.

Having described an embodiment of my invention, I claim:

1. A dynamo electric machine having cooling facilities comprising, a winding, a coil of hollow tubing adapted to have a coolant circulated therethrough adjacent said winding and a substantially continuous mass of insulation having high heat conductive properties penetrating and covering said winding and surrounding said winding and coil.

2. A dynamo electric machine have cooling facilities comprising, a housing of molded insulation having high heat conductive properties, a winding, and a coil of hollow tubing adapted to have a coolant circulated therethrough adjacent said winding, said winding and said coil being buried in the insulation composing said housing.

3. A dynamo electric machine having cooling facilities comprising, a completely enclosed housing of molded insulating material having high heat conducting properties, a magnetizable core, a winding on said core, and a coil of hollow metal tubing surrounding said core and winding and adapted to have a coolant circulated therethrough, said core, winding and coil being imbedded in and completely surrounded by the insulation composing said housing.

In testimony whereof I affix my signature.

VINCENT G. APPLE.